United States Patent [19]

Hyodo

[11] 4,173,028
[45] Oct. 30, 1979

[54] CASSETTE-TYPE RECORDING AND/OR REPRODUCING APPARATUS

[75] Inventor: Kenji Hyodo, Kawasaki, Japan

[73] Assignee: Sony Corporation, Tokyo, Japan

[21] Appl. No.: 875,098

[22] Filed: Feb. 3, 1978

[30] Foreign Application Priority Data

Feb. 12, 1977 [JP] Japan .................... 52-16355[U]

[51] Int. Cl.² .................. G11B 19/02; G11B 15/00
[52] U.S. Cl. .................................. 360/69; 360/96.6
[58] Field of Search ............... 360/69, 96, 93, 105, 360/71, 137; 242/197–200

[56] References Cited
U.S. PATENT DOCUMENTS

| 3,439,919 | 4/1969 | Laa ............................ 360/96 |
| 3,638,953 | 2/1972 | Kodama et al. .............. 360/96 |
| 3,724,858 | 4/1973 | Martin ......................... 360/96 |
| 3,766,327 | 10/1973 | Johnson et al. ............. 360/96 |
| 3,987,486 | 10/1976 | Ito et al. ..................... 360/96 |
| 4,021,855 | 5/1978 | Czonka et al. .............. 360/69 |
| 4,087,844 | 5/1978 | Takahashi et al. .......... 360/96 |

Primary Examiner—Alfred H. Eddleman
Attorney, Agent, or Firm—Lewis H. Eslinger; Alvin Sinderbrand

[57] ABSTRACT

A recording and/or reproducing apparatus using a tape-cassette includes a cassette holder for holding the tape-cassette, an operating mechanism for moving the cassette holder from an operative, or lowered, position to an eject, or raised, position, a first detecting device for detecting whether power is being applied to the apparatus, and a second detecting device for detecting whether the cassette holder contains a tape cassette. In the recording and/or reproducing apparatus, when the power switch is turned on while the cassette holder is in its operative position, and there is no tape-cassette in the cassette holder, the cassette holder is automatically raised to the eject position.

7 Claims, 9 Drawing Figures

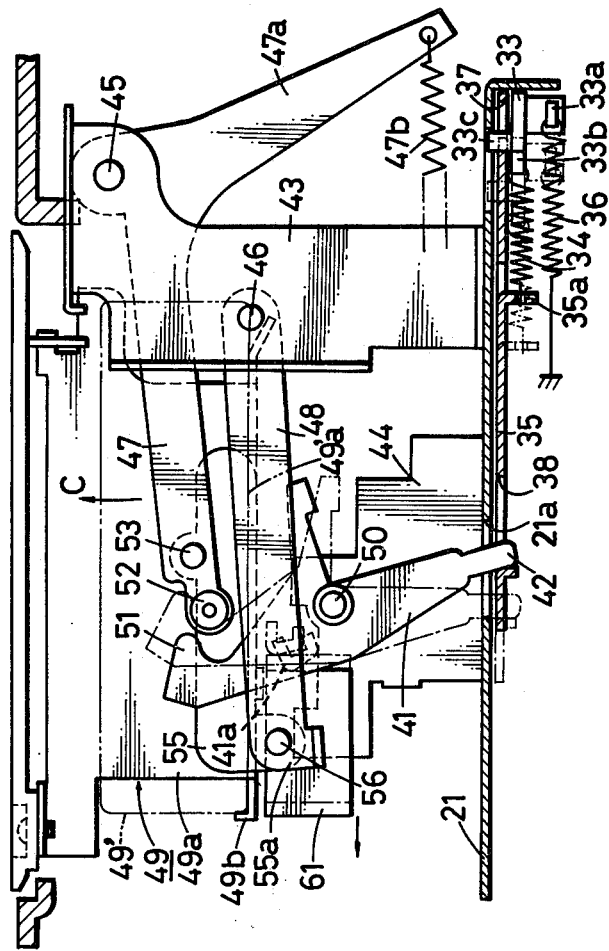

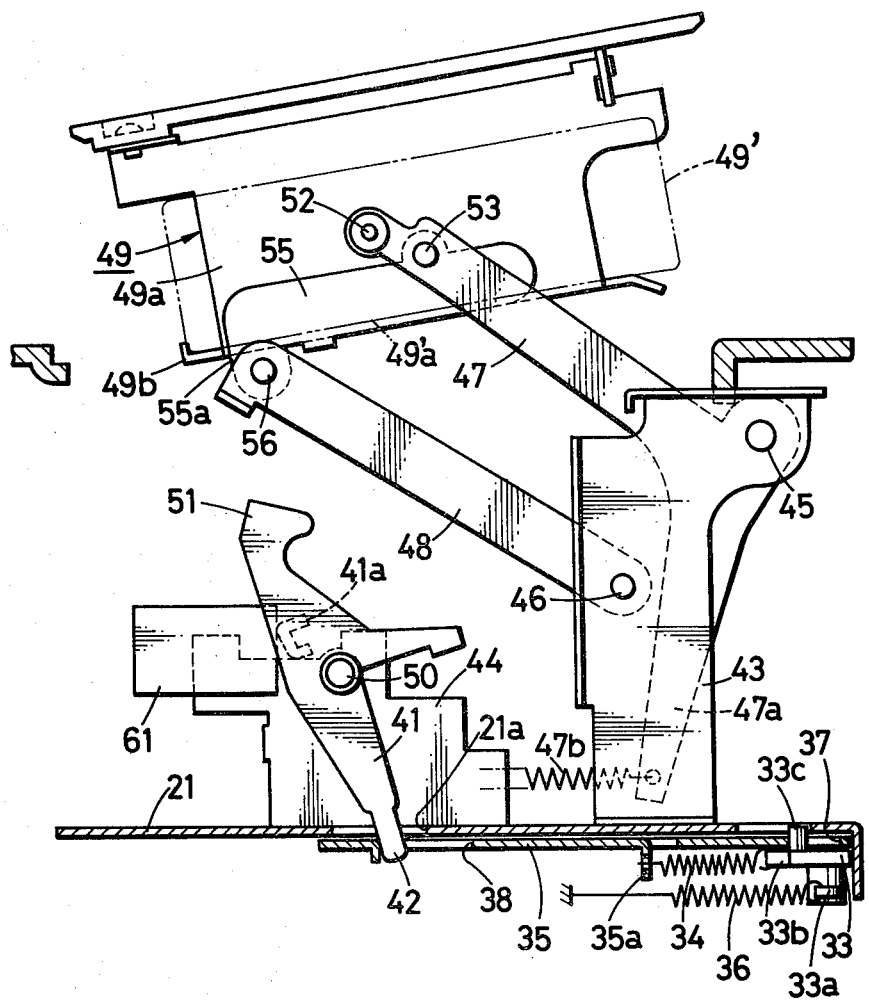

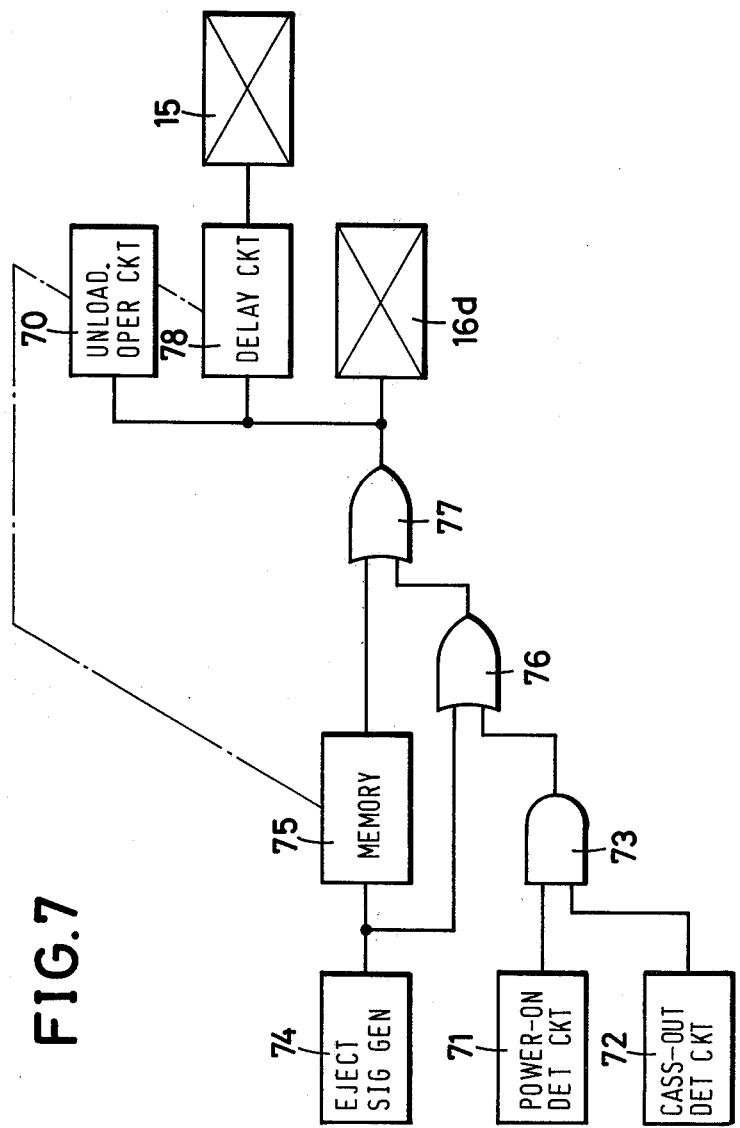

CASSETTE-TYPE RECORDING AND/OR REPRODUCING APPARATUS

BACKGROUND OF THE INVENTION

1. Field of the Invention

This invention relates generally to a recording and-/or reproducing apparatus using a tape-cassette, and more particularly to a cassette ejecting mechanism in a recording and/or reproducing apparatus in which a cassette holder to contain an tape-cassette is movable between the operative position and an eject position.

2. Description of the Prior Art

In the conventional recording and/or reproducing apparatus, the cassette ejecting mechanism is interlocked with an ejection-operating mechanism which can be activated by depressing an ejecting push button. If a user desires to exchange a tape cassette for one in the cassette holder or if the user desires to remove the tape cassette from the cassette holder when he is finished using the apparatus, the ejection-operating mechanism is actuated to drive the cassette ejecting mechanism.

In conventional recording and/or reproducing apparatus, the ejection-operating mechanism is necessarily actuated at the beginning of the use, and then the cassette holder is loaded with a desired tape-cassette.

Usually, when the use of the recording and/or reproducing apparatus is ended, the tape-cassette is taken out from the cassette holder in order to protect the magnetic tape in the cassette, and the empty cassette holder is placed at the operative position, in order to protect against damage to the apparatus itself.

When a prior art and/or reproducing apparatus including the cassette ejecting mechanism interlocked only with the ejection-operating mechanism is used, the user must first confirm that there is a tape cassette in the cassette holder. When a cassette has been placed in the cassette holder, the holder is moved down to the operative position, and then the desired recording operation or reproducing operation is carried out. If there is no cassette in the cassette holder, a desired tape cassette must first be inserted into the cassette holder while located at the eject position, and then the cassette holder is moved down to the operative position to effect the desired operation.

As above described, the user must perform additional steps when he begins or finishes use of the apparatus. As a result, it is troublesome to operate the conventional cassette recording and/or reproducing apparatus.

OBJECTS AND SUMMARY OF THE INVENTION

Accordingly, it is an object of this invention to provide a cassette recording and/or reproducing apparatus which overcomes the above described disadvantage of the conventional recording and/or reproducing apparatus. More specifically, it is an object of this invention to provide a cassette recording and/or reproducing apparatus with an improved cassette ejecting mechanism convenient for use.

Another object of this invention is to provide a cassette-type recording and/or reproducing apparatus in which, when a power switch is turned on in such a condition that an empty cassette holder is located at its operative position, the cassette holder is automatically moved to its ejected position so that the user can recognize that the cassette holder should be loaded with a desired tape cassette.

A further object of this invention is to provide a practical cassette-type recording and/or reproducing apparatus in which it is not necessary to carry out a separate eject operation at the beginning and at the end of play.

In accordance with an aspect of this invention, a cassette ejection mechanism for a cassette recording and/or reproducing apparatus includes a cassette holder movable between an operative position, in which signals recorded on the tape in a cassette can be played-back or signals can be recorded on the tape and an eject position, in which the cassette can be inserted into or removed from the cassette holder, an operating mechanism for moving the cassette holder from the operative position to the eject position, a first detecting device for detecting whether a cassette is present in the holder and providing an output whenever a cassette is not present in the holder while the holder is in the operative position, a second detecting device for detecting whether power is being applied to the apparatus and providing an output whenever power is so applied, and a control mechanism for actuating the operating mechanism in response to simultaneous outputs from the first and second detecting devices. Preferably, the control mechanism includes a mode change-over device capable of being set into an ejecting position, and an interlock device linked with the operating mechanism, and which interlocks with the mode change-over device when the latter is in its eject position for actuating the operating mechanism.

When a cassette recording and/or reproducing apparatus is used, a cassette holder should be loaded with a tape cassette at the beginning of each use. In a cassette recording and/or reproducing apparatus according to this invention, a cassette holder, if empty, is automatically moved to its ejected position with the switching-on of power to the apparatus. Accordingly, the usual ejecting operation preliminary to use is not required in order to load the cassette holder with a tape cassette.

Various other objects, advantages and features of the present invention will become readily apparent from the ensuing detailed description, and the novel features will be particularly pointed out in the appended claims.

BRIEF DESCRIPTION OF THE DRAWINGS

FIG. 1A, FIG. 1B and FIG. 1C are elevational views of a lifting device in a cassette-ejecting mechanism according to one embodiment of this invention, which are shown in sequential order of operation;

FIG. 7 is a block diagram of an electric circuit used for the cassette-ejecting mechanism.

DESCRIPTION OF THE PREFERRED EMBODIMENTS

A cassette-ejecting mechanism according to one embodiment of this invention which will be applied to a video tape recorder (V T R), will be described with reference to the drawings.

Figure 1A:
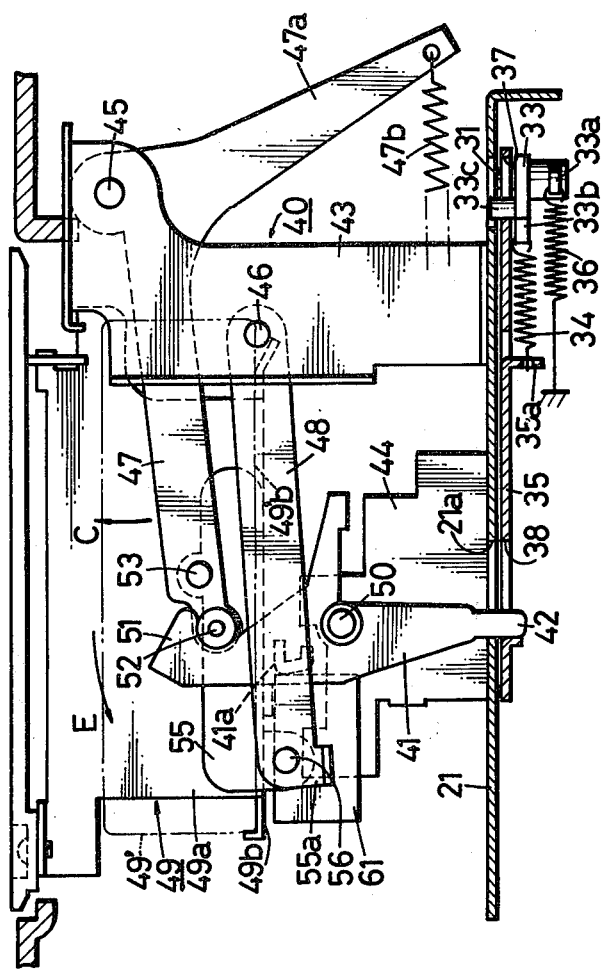
Figure 2:
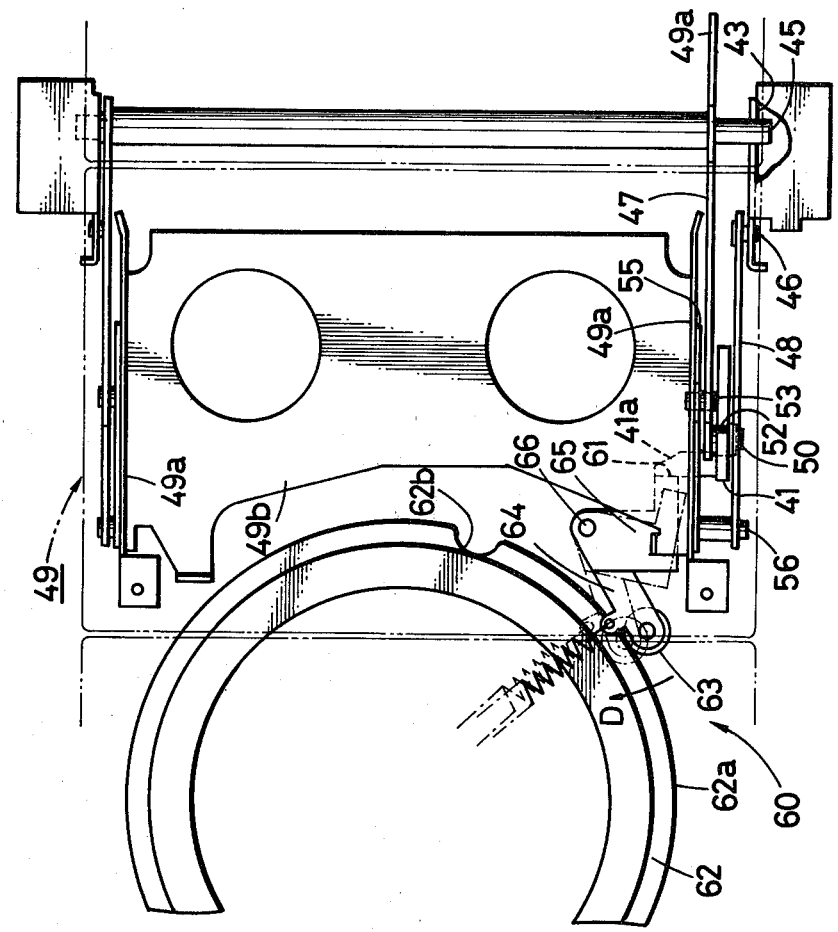
FIG. 2 is a plan view of the lifting device of FIG. 1A to FIG. 1C.
Figure 3:
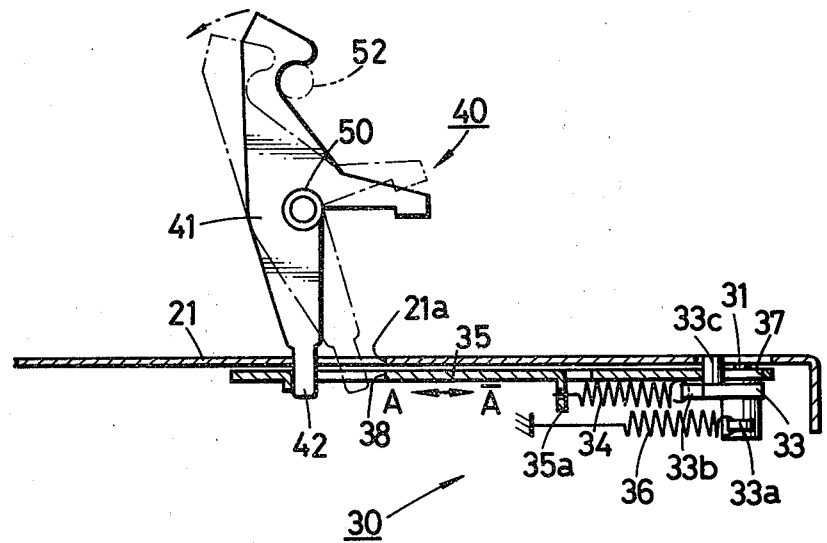
FIG. 3 is an elevational view showing the relationship between the lifting device and an interlocking device in the cassette-ejecting mechanism.
Figure 5:
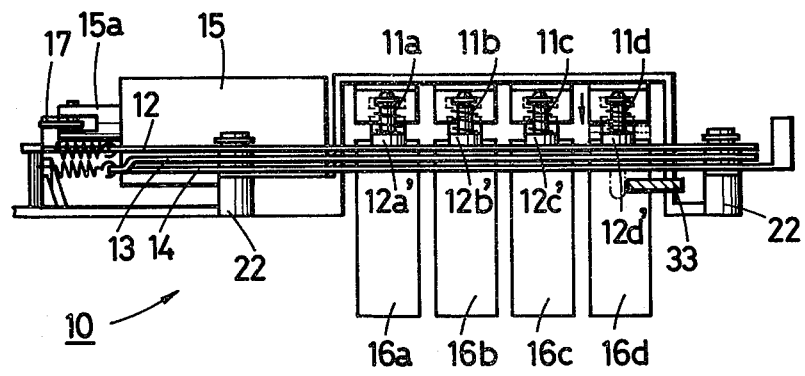
FIG. 5 is an elevational view of the mode change-over device.
Figure 4:
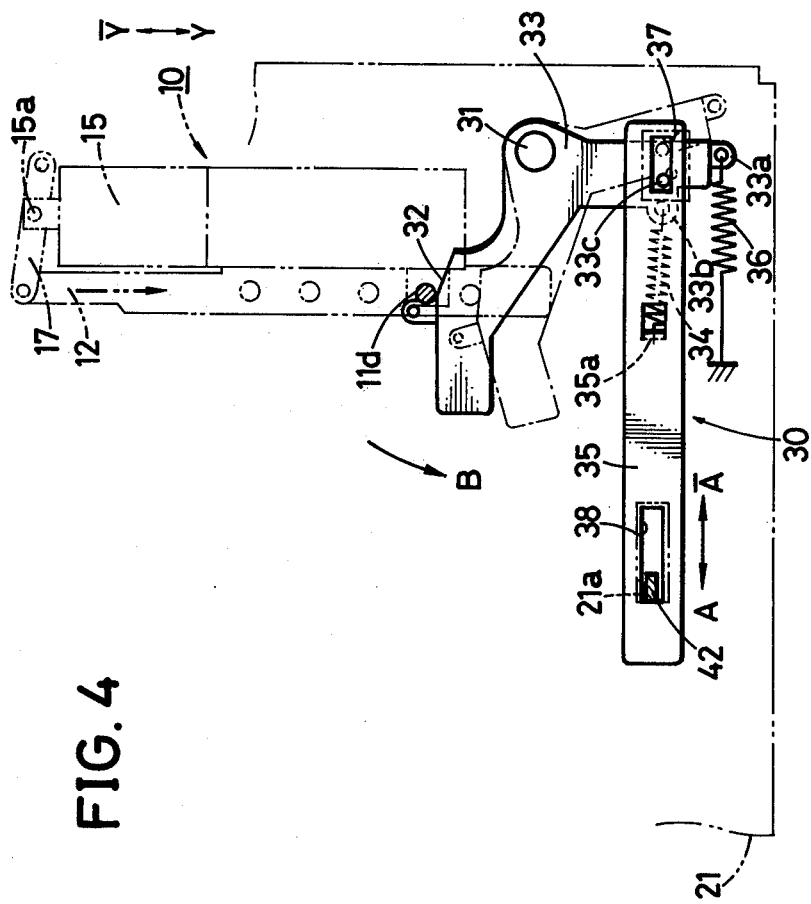
FIG. 4 is a bottom view showing the relationship between the interlocking device of FIG. 3 and a mode change-over device in the cassette-ejecting mechanism.
Figure 6:
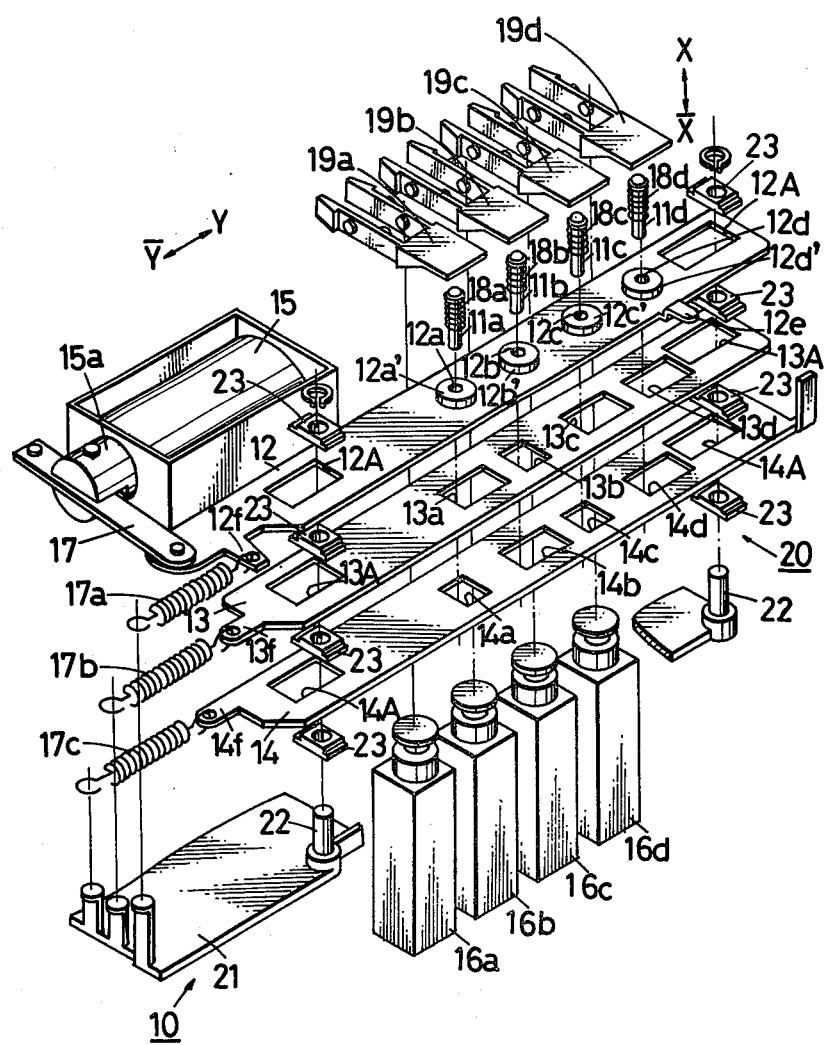
FIG. 6 is an exploded perspective view of the mode change-over device of FIG. 5.

In a cassette-ejecting mechanism, a lifting device 40 which is arranged above a chassis 21 as shown in FIG. 1A, FIG. 1B, FIG. 1C and FIG. 2, is interconnected to a mode change-over device 10 shown in FIG. 5 and FIG. 6 through an interlocking device 30 which is arranged under the chassis 21 as shown in FIG. 3 and FIG. 4.

FIG. 5 is an elevational view of the mode change-over device 10 and FIG. 6 is an exploded perspective view of the latter. The mode change-over device 10 includes four operating pins 11a, 11b, 11c and 11d, first, second and third slide plates 12, 13 and 14 to be engaged with the operating pins 11a, 11b, 11c and 11d, a main plunger-solenoid 15 to drive the first slide plate 12, and first, second, third and fourth plunger-solenoids 16a, 16b, 16c and 16d to drive the operating pins 11a, 11b, 11c and 11d through operating arms 19a, 19b, 19c and 19d. When one or two of not-shown push-buttons are depressed, the plunger-solenoids 15, 16a to 16d are selectively energized for changing the mode of the VTR.

One end of the first slide plate 12 is connected through a connecting arm 17 to a plunger 15a of the main plunger-solenoid 15. Guide cylinders 12a', 12b', 12c' and 12d' having through-holes 12a, 12b, 12c and 12d are fixed on the first slide plate 12 along the lengthwise direction of the latter. The operating pins 11a to 11d are selectively inserted into the guide cylinders 12a' to 12d' with the energization of the plunger-solenoids 16a to 16d. An actuating projection 12e is formed on one edge of the first slide plate 12. Interlocking openings 13a, 13b, 13c, 13d, 14a, 14b, 14c and 14d are made in the second and third slide plates 13 and 14, into which the operating pins 11a to 11d are inserted. In the second slide plate 13, the interlocking opening 13b is small in comparison with the other interlocking openings 13a, 13c and 13d. When the operating pin 11b is inserted through the guide cylinder 12b' of the first slide plate 12 into the small interlocking opening 13b, the first and second slide plates 12 and 13 are interlocked with each other. In the third slide plate 14, the interlocking openings 14a and 14c are small in comparison with the other interlocking openings 14b and 14d. When the operating pins 11a and 11c are inserted through the guide cylinders 12a' and 12c' of the first slide plate 12 into the small interlocking openings 14a and 14c, the first and third slide plates 12 and 14 are interlocked with each other.

Pairs of guide openings 12A, 13A and 14A are made in the first, second and third slide plates 12, 13 and 14, at the end portions, respectively. The first, second and third slide plates 12, 13 and 14 are regulated in the direction of the movement at the guide openings 12A, 13A and 14A by means of a slide plate guide mechanism 20 including slide-plate supporting members 23 which is schematically shown in FIG. 6.

Springs 17a, 17b and 17c are fixed on projections 12f, 13f and 14f formed on the ends of the first, second and third slide plates 12, 13 and 14 to urge the latter in the direction shown by the arrow Y, respectively. Coil springs 18a, 18b, 18c and 18d are wound on the operating pins 11a, 11b, 11c and 11d to urge the latter in the direction shown by the arrow $\overline{X}$. The plunger-solenoids 16a, 16b, 16c and 16d work to drive the operating pins 11a, 11b, 11c and 11d through the operating arms 19a, 19b, 19c and 19d in the direction shown by the arrow $\overline{X}$.

The slide-plate supporting members 23 are fitted to support pins 22 fixed on the chassis 21 to regulate the direction of the movement of the slide plates 12, 13 and 14.

FIG. 3 and FIG. 4 show the interlocking device 30 which cooperates with the mode change-over device 10 to drive a lifting device 40, when the mode change-over device 10 is put in the ejecting mode. A generally V-shaped operating lever 33 is rotatably supported by a support pin 31 fixed on the undersurface of the chassis 21, and the lever 33 contacts with the fourth operating pin 11d of the mode change-over device 10 at its contact portion 32. An interlocking slide 35 is connected through a connecting spring 34 to the operating lever 33, and the slide 35 is engaged with a stopper lever 41 of the lifting device 40. First and second spring receivers 33a and 33b are formed on one end of the operating lever 33. Further, a pin 33c projecting toward the chassis 21 is fixed on one end of the operating lever 33. One end of a spring 36 is connected to the first spring receiver 33a so as to urge the operating lever 33 in the clockwise direction (FIG. 4).

First and second oblong holes 37 and 38 are made in the interconnecting slide 35 near the ends. A spring receiver 35a is projected on the intermediate portion of the interconnecting slide 35. The pin 33c of the operating lever 33 is inserted into the first oblong hole 37 of the interconnecting slide 35. The connecting spring 34 is connected between the second spring receiver 33b of the operating lever 33 and the spring receiver 35a of the interconnecting slide 35.

In the ejecting operation, the fourth plunger-solenoid 16d is energized with the depression of a not-shown ejecting push-button to move down the fourth operating pin 11d as shown in FIG. 5. In such a condition, the main plunger-solenoid 15 is energized to move the first slide plate 12 in the direction shown by the arrow Y. The contact portion 32 of the operating lever 33 of the interlocking device 30 is pushed by the fourth operating pin 11d which is moved together with the first slide plate 12. Accordingly, the operating lever 33 pivots on the support pin 31 in the counterclockwise direction shown by the arrow B. Since the interlocking slide 35 of the interlocking device 30 is connected through the connecting spring 34 to the operating lever 33, the interconnecting slide 35 is moved in the direction shown by the arrow A with the rotation of the operating lever 33.

An engaging portion 42 of the stopper lever 41 of the lifting device 40 is inserted into the second oblong hole 38 of the interconnecting slide 35 of the interlocking device 30. The lifting device 40 is so designed as to interlock with the mode change-over device 10 in the ejecting mode.

Next, there will be described construction of the lifting device 40 which is shown in FIG. 1A, FIG. 1B, FIG. 1C and FIG. 2.

First and second support plates 43 and 44 project upward from the chassis 21. First and second lifting arms 47 and 48 are rotatably supported by first and second support pins 45 and 46 fixed on the first support plate 43, respectively, and they support a cassette holder 49 which is shown holding a cassette 49'. The stopper lever 41 is rotatably supported by a third support pin 50 fixed on the second support plate 44. A stopper pin 52 is fixed on a top end of the first lifting arm 47. When the stopper pin 52 of the first lifting arm 47 is engaged with a hook portion 51 of the stopper lever 41 as shown in FIG. 1A, the cassette holder 49 is held at its lower position, that is at the operative position.

The first lifting arm 47 is rotatably supported at its intermediate portion by the first support pin 45. A fourth support pin 53 is fixed on one end of the first lifting arm 47, and the pin 53 rotatably supports a side plate 49a of the cassette holder 49. The stopper pin 52 fixed on the top end of the first lifting arm 47 is so designed as to be engaged with the stopper portion 51 of the first lifting arm 47. A spring 47b for urging the cassette holder 49 to the upper, or eject position is fixed to another end 47a of the first lifting arm 47 to urge the latter in the clockwise direction shown by the arrow C in FIG. 1A and FIG. 1B. When the stopper pin 52 of the first lifting arm 47 is disengaged from the hook portion 51 of the stopper lever 41, the first lifting arm 47 and the second lifting arm 48 are rotated by the spring 54 to their upper positions in the direction shown by the arrow C (FIG. 1C).

A support plate 55 so bent as to support a bottom plate 49b of the cassette holder 49 is rotatably supported by the fourth support pin 53. A support projection 55a is formed on one end of the support plate 55. A fifth support pin 56 is fixed on the support projection 55a of the support plate 55. The second lifting arm 48 is pivotally mounted on the first support pin 46 and the fourth support pin 56 at respective ends thereof.

The stopper lever 41 is rotatably supported by the second support pin 50 fixed on the second support plate 44. The engaging end 42 of the stopper lever 41 is inserted through an opening 21a made in the chassis 21 and the second oblong hole 38 of the interconnecting slide 35. The hook portion 51 formed on the upper end of the stopper lever 41 is engaged with the stopper pin 52 fixed on the end of the first lifting arm 47. A stopper projection 41a is so fixed on the stopper lever 41 as to be contactable with a contact end 61 of an end detection mechanism 60.

The end detection mechanism 60, as shown in FIG. 2, includes a detection arm 64 which supports a detecting roller 63 contacting with a circumferential surface 62a of a loading ring 62, and an operating arm 65 which is formed integrally with the detection arm 64 and is provided with the contact end 61. The end detection mechanism 60 is rotatably supported at its intermediate portion by a support pin 66 fixed on a mounting plate (not shown) projecting so transversely from the second support plate 44 as to be parallel with the chassis 21, and it is urged in the clockwise direction D round the support pin 66 so that the detecting roller 63 is pressed to the circumferential surface 62a of the loading ring 62. A recess 62b is formed in the circumferential surface 62a. When the VTR is in the unloaded condition, and tape is returned by the loading ring 62 to the cassette, the detecting roller 63 of the end detection mechanism 60 is received by the recess 62b.

When the contact end 61 of the end detection mechanism 60 contacts with the stopper projection 41a of the stopper lever 41 of the lifting device 40 as shown by the phantom line in FIG. 2, the stopper lever 41 is prohibited from rotating, and the cassette holder 49 is prevented from being raised to its eject position. When the magnetic recording and/or reproducing apparatus (VTR) is put in the unloaded condition, the interconnecting slide 35 is slided in the direction shown by the arrow A (FIG. 3 and FIG. 4), with the energization of the fourth plunger-solenoid 16d and of the main plunger-solenoid 15. The stopper lever 41 engaged with the interconnecting slide 35 is rotated in the direction shown by the arrow E in FIG. 1A, to disengage the hook portion 51 of the stopper lever 41 from the stopper pin 52 of the first lifting arm 47. The latter is rotated in the direction shown by the arrow C (FIG. 1B), by function of the spring 47b fixed on the end of the first lifting arm 47. As the result, the cassette holder 49 is moved up to its upper position, or eject position.

FIG. 7 shows a block diagram of an electric circuit used for the above-described embodiment.

A power-on detecting circuit 71 provides a high level pulse having a predetermined pulse width, when a power switch (not shown) is turned on to supply an electric power to the magnetic recording and/or reproducing apparatus. A cassette-out detecting circuit 72 provides an output signal of a high level, when the cassette holder 49 not containing tape cassette 49' is put in the operative position. The output terminals of the detecting circuits 71 and 72 are connected to input terminals of an AND gate 73.

An ejecting-signal generator 74 generates an ejecting signal of a predetermined pulse width, when a not shown ejecting push-button is depressed. A condition-memory circuit 75 provides an terminals signal of a high level, when the apparatus is put in the loaded condition. The output terminals of the AND gate 73 and ejecting-signal generator 74 are connected to input terminals of a first OR gate 76. The output terminals of the condition-memory circuit 75 and first OR gate 76 are connected to input termianls of a second OR gate 77, respectively.

The output signal of the second OR gate 77 is delayed by a predetermined time by a delay circuit 78, and then supplied to the main plunger-solenoid 15 to energize the latter. Further, the output signal of the second OR gate 77 is supplied to the fourth plunger-solenoid 16d and an unloading operation circuit 70 to energize and drive the latter.

The cassette-out detecting circuit 72 includes a micro-switch (not shown) fixed on the chassis 21 so that the actuator of the micro-switch contacts with the bottom surface 49b' of the tape cassette 49'. The condition-memory circuit 75 includes another micro-switch which is actuated with the operation of the end detection mechanism 60.

When the power switch is turned on in such condition that the cassette holder 49 does not contain the tape cassette 49' is put in the operative position, the high level output signals are obtained from both of the power-on detecting circuit 71 and cassette-out detecting circuit 72, and supplied to the AND gate 73. Accordingly, the output signal is obtained from the second OR gate 77, and supplied to the unloading operation circuit 70 and fourth plunger-solenoid 16d, and through the delay circuit 78 to the main plunger-solenoid 15.

The fourth operating pin 11d is pushed downward with the energization of the fourth plunger-solenoid 16d, and then the first slide plate 12 is slided in the direction shown by the arrow Y with the energizatin of the main plunger-solenoid 15, carrying the fourth operating pin 11d. As the result, as above described,, the cassette holder 49 is raised to its eject position.

When the cassette holder 49 does not contain the tape cassette 49' at the operative or lower position a magnetic tape is normally not wound on a head drum (unload condition), and so the unloading operation circuit 70 is not so driven as to rotate the loading ring 62.

When the power switch is turned on in such a condition that the cassette holder 49 containing the tape cassette 49' is put in the operative position, the output signal of the cassette-out detecting circuit 72 is at the lower level. The AND gate 73 is closed. The output signal is not obtained from the AND gate 73. The cassette holder 49 is not raised to its eject position.

In the usual ejecting operation, the ejecting signal is obtained from the ejecting-signal generator 74 with the depression of the not-shown ejecting push-button. The output signal is obtained from the second OR gate 77. As the result, the cassette holder 49 is raised to its eject position.

When the magnetic tape is wound on the head drum (loaded condition), the detecting roller 63 of the end detection mechanism 60 contacts with the circumferential surface 62a, not with the recess 62b. The contact end 61 of the end detection mechanism 60 contacts with the stopper projection 41a of the stopper lever 41 of the lifting device 40 to prohibit the stopper lever 41 from rotating. Since the operating lever 33 is connected through the spring 34 to the interconnecting slide 35 of the interlocking device 30, and the pin 33c fixed on one end of the operating lever 33 is inserted into the oblong hole 37 of the interconnecting slide 35, the operating lever 33 is not prohibited from rotating round the support pin 31.

The condition-memory circuit 75 is driven with the ejecting signal obtained from the ejecting-signal generator 74. The main plunger-solenoid 15, the fourth plunger-solenoid 16d and the unloading operation circuit 70 are continuously driven with the output signal of the condition-memory circuit 75.

A not-shown drive motor is driven with the unloading operation circuit 70 to rotate the loading ring 62. When the unloading operation is effected the detecting roller 63 of the end detecting mechanism 60 is received by the recess 62b of the loading ring 62, the stopper lever 41 is released from the contact end 61 of the end detection mechanism 60, and so the stopper lever 41 is rotated in the counter-clockwise direction about the support pin 50 by the connecting spring 34. The stopper pin 52 of the first lifting arm 47 is disengaged from the hook portion 51 of the stopper lever 41. The cassette holder 49 is raised to its eject position.

As above described, according to this invention, when the power switch is turned on to supply electric power to the magnetic recording and/or reproducing apparatus, and the empty cassette holder is located at its operative position, the cassette holder is automatically moved to its eject position, so that the user can recognize that the cassette holder should be loaded with a desired tape cassette. The present invention provides the practical result that at the beginning of the use of the magnetic recording and/or reproducing apparatus, the usual ejecting operation is not required in order to load a cassette into the cassette holder.

While the preferred embodiment has been described, variations thereto will occur to those skilled in the art within the scope of the present inventive concepts which are delineated by the following claims.

What is claimed is:

1. A cassette ejection mechanism for a cassette recording and/or reproducing apparatus comprising:
   cassette holding means movable between an operative position and an eject position;
   operating means for moving said cassette holding means from said operative position to said eject position;
   first detecting means for detecting whether a cassette is present in said cassette holding means and providing an output whenever a cassette is not present in said cassette means and said cassette holding means is in the operative position;
   second detecting means for detecting whether power is being applied to said apparatus and providing an output whenever power is so applied; and
   control means for actuating said operating means in response to the simultaneous outputs of said first and second detecting means.

2. A cassette ejection mechanism according to claim 1, in which said control means includes mode change-over means selectively movable to an ejecting position in response to selection of an ejecting mode, and interlock means interlocked with said mode change-over means when the latter is in the ejecting position for actuating said operating means to move said cassette holding device to the eject position.

3. A cassette ejection mechanism for a cassette recording and/or reproducing apparatus comprising:
   cassette holding means movable between an operative position and an eject position;
   operating means for moving said cassette holding means from said operative position to said eject position, including a stopper member, a supporting member for supporting said cassette holding means, and resilient biasing means urging said supporting member in the direction for moving said cassette holding means to said eject position;
   first detecting means for detecting whether a cassette is present in said cassette holding means and providing an output whenever a cassette is not present in said cassette holding means and said cassette holding means is in the operative position;
   second detecting means for detecting whether power is being applied to said apparatus and providing an output whenever power is so applied; and
   control means for actuating said operating means in response to the simultaneous outputs of said first and second detecting means, incuding mode change-over means selectively movable to an ejecting position in response to selection of an ejecting mode, and interlock means interlocked with said mode change-over means when the latter is in the ejecting position for actuating said operating means to move said cassette holding device to the eject position;
   said stopper member of the operating means acting to restrict said supporting member from moving said cassette holding means toward said eject position when said ejecting mode has not been selected, and acting to release said supporting member when said ejecting mode has been selected.

4. A cassette ejection mechanism according to claim 3, in which said control means further includes means for selecting the ejecting mode of said mode change-over device in response to simultaneous outputs from said first and second detecting means.

5. A cassette ejection mechanism according to claim 3, in which said mode change-over means and said interlock means act to release said stopper member whenever said ejecting mode is selected, so that said cassette holding means is moved to said eject position.

6. A cassette ejection mechanism according to claim 5, in which said apparatus has a loaded condition wherein tape is withdrawn from the cassette for recording and/or reproducing signals thereon, and further including means for prohibiting said stopper member from releasing said supporting member when said apparatus is in the loaded condition.

7. A cassette ejection mechanism according to claim 6, in which said interlock means includes an interconnecting slide and an operating lever resiliently connected to said interconnecting slide, said operating lever having an arm contactable with said mode change-over means for driving the operating lever in the ejecting mode, and said interconnecting slide being engaged with said stopper member to cause the latter to release said supporting means whenever said mode change-over means drives said operating lever.

* * * * *